Feb. 2, 1954 — J. R. BOYER ET AL — 2,667,804
HIGH-TEMPERATURE PACKING
Filed June 21, 1949 — 2 Sheets-Sheet 1

INVENTORS,
JOHN R. BOYER &
RICHARD M. LUCKRING
BY
ATTORNEY

Feb. 2, 1954

J. R. BOYER ET AL 2,667,804

HIGH-TEMPERATURE PACKING

Filed June 21, 1949

INVENTORS,
JOHN R. BOYER &
RICHARD M. LUCKRING

BY *[signature]*

ATTORNEY

Patented Feb. 2, 1954

2,667,804

UNITED STATES PATENT OFFICE 2,667,804

HIGH-TEMPERATURE PACKING

John R. Boyer, Avondale, Pa., and Richard M. Luckring, Wilmington, Del., assignors to E. I. du Pont de Nemours & Company, Wilmington, Del., a corporation of Delaware Application June 21, 1949, Serial No. 100,452

2 Claims. (Cl. 87—1)

This invention relates to a temperature-resistant fibrous packing and sealing composition, and more particularly, to such a composition that is capable of withstanding high temperatures in chemical and similar operations and at the same time will permit relative expansion between joined tubes fabricated from similar or widely different materials.

Ordinary packings or sealing materials are entirely unsuitable for high temperature operations, particularly operations conducted at 800° to 1000° C. and higher, because they burn or fuse, and their characteristics change or their compositions are partially or entirely altered.

Also, in many processes where highly reactive gases must be pumped through tubes, joints, and the like, an effective sealing medium is required to resist the chemical action accompanied by high temperatures to avoid leaks and resulting damage.

A further serious problem is the relatively great thermal expansion compensation which must be provided between tubes of the same or different materials over the very great temperature range involved in some operations. In some processes, for example, it is necessary to use silica or other ceramic tubes for certain portions of the process apparatus where subjected to exposure to the very highest temperatures, and the relatively low tensile strength of some of these materials renders joinder a very difficult problem. Furthermore, silica or other ceramic tubes frequently have an eccentric cross section due to inaccuracies in the forming process and the exact registering or mating over the entire cross-sectional area of any two tubes to be joined is generally impossible.

This invention has as an object a solution of the foregoing problems and to provide a thermally and chemically resistant unitary construction which may be retained in position in a number of ways to be described hereinafter.

A further object is the provision of safe and economical means for tightly joining process tubing conveying materials under very high temperatures, particularly in the region above 800° C. A still further object is the provision of such means that will permit relative expansion and the relief of thermal stresses between joined members. Another object is the provision of such a means for tightly joining process tubing conveying materials at very high temperatures where the tubes are fabricated from the same or different materials, such as all silica, partly silica and partly metal, or entirely metal.

Still another object is the provision for tightly sealing off entirely the ends of lengths of process tubing in high temperature chemical processing systems.

According to this invention these objects are accomplished by employing silica yarn in tightly woven or braided form, the interstices of which are preferably sealed with a temperature-resistant particulate material, the packing being retained in place by a stuffing box construction located at the point of sealing in the manner hereinafter described and illustrated in the accompanying drawings in which.

Figure 1:
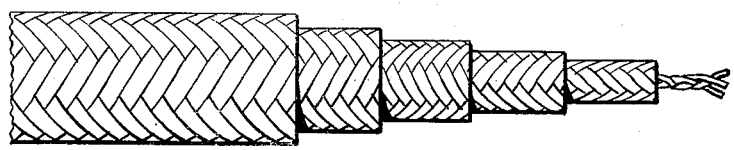
Figure 1 shows one form of braided packing construction, with successive braid layers stripped back to more clearly show the method of fabrication.

The individual strands of the packing material of this invention are formed by twisting together small diameter yarns of silica obtained by the extrusion of molten silica into a cooling medium. The yarns so formed are preferably substantially pure silica but may contain minor amounts of zirconium, magnesium or aluminum compounds and may also contain spectrographic traces of sodium, calcium, titanium, barium, iron, copper and boron salts. Silica yarns of about 0.046 inch diameter, corresponding to about 615 denier, have proved satisfactory for the purposes of this invention. The individual yarn fibers are preferably loosely twisted into bundles of about twelve fibers each, and two of these bundles are then twisted into a single strand. A plaited braid may be made up of any number of these strands, so long as the resulting rope is sufficiently flexible to permit the formation of a coil shape such as is hereinafter described. We have found that a braid-over-braid construction is well suited to the purposes contemplated.

It has been found that the silica strands formed as described above have a relatively low strength, particularly in bending, and also tend to fray in their passage through the braiding machine eyelets, and that it is therefore preferable to coat these strands with a suitable lubricant prior to braiding. Furthermore, the strands are somewhat porous in nature, due to the fact that the individual fibers from which they are formed will not withstand the stresses of hard twisting necessary to produce a relatively dense structure, and it is therefore desirable to seal the void spaces with a suitable sealing agent.

We have found that microcrystalline wax or the commercial product marketed by the Standard Oil Company of New Jersey under the trade name of "Caloria Oil" are equally effective as lubricating materials. For the sealant we prefer to utilize graphite, either admixed with the lubricant, or applied separately to the fibers, as hereinafter described. It will be understood however that other sealing materials may be used to meet the requirements, provided they are capable of withstanding the very high temperatures and the chemical environments to which the packing will be subjected in service. This is not necessary, however, in the case of the lubricating material, since it will have served its purpose when the braiding operation has been completed.

If the chemical process materials in flow are not reactive with any of the individual materials hereinafter listed, amorphous silica, titanium dioxide, tantalum oxide, or other like manufactured or naturally occurring materials, either singularly or in mixture one with another, may be substituted for the graphite. Also, aluminum oxide may be employed as a sealant, providing the process gases are free from substantial amounts of acids. The particle size of the sealant material is not particularly critical, sizes ranging from about ½ micron to about 50 microns being entirely suitable.

When microcrystalline wax is used as a lubricant, application may be effected by merely passing the individual strands through a molten bath of the material disposed between the storage spool and the braiding head of a conventional braiding machine. Satisfactory results are also attained when the microcrystalline wax is dissolved in a suitable hydrocarbon solvent, the strands being processed by continuous transit therethrough in the same manner as when molten material is used. Since "Caloria Oil" is liquid at room temperatures, it is easily applied by simple dip bath techniques.

The graphite or other sealant may be applied by simply dusting liberal quantities of the powdered material onto the strands as they emerge from the lubricant-applying bath, or, in the alternative, the sealant may be dusted on the outer braided jacket after each successive pass through the braiding machine. The amount of sealant take-up is not critical so long as the individual strands give the visual appearance of being fairly evenly coated. In one analytical determination of the amount of take-up it was found that 18% of dry graphite was deposited upon a single strand, made up of 24 individual threads, based on the dry weight of the silica.

The structure of the packing contemplated in this invention is preferably of the conventional type known in the trade as "braid-over-braid." Referring to Figure 1 the unit packing consists of any desired number of individual braided servings superimposed one on another until a composite bundle of the desired size is attained. This fabrication is accomplished by passing the braid through the braiding machine a number of times, and increasing the number of individual strands as the circumference of the braid is built up so that the individual strands lie quite close together. The resulting rope is finally passed through a pressing die which compresses the construction to a generally square or rectangular cross section without, however, loosening the individual strands of the braid or substantially decreasing the compactness. The resulting structure is a relatively dense, compact, linear-sided rope, the interstices of which are sealed by the successive braid layers and the sealant compound to present a minimum of channels for the passage of fluids therethrough. If the braided rope is lubricated with a wax solution, it is preferably dried by heating to a temperature of about 100° C. before further forming.

The dry braided rope is cut into the desired lengths for use as individual packing members. Where the packing is to be used at temperatures up to about 300° C., no allowance need be made for shrinkage. However, at temperatures in the neighborhood of 1000° C. the braided rope will shrink about 14% in cross sectional area and approximately 10% in length. Therefore, for use in any particular location, material of oversize dimensions within the shrinkage range indicated should be selected. The oversize pieces are preferably preshrunk before installation by coiling them loosely about a ceramic or metal pipe length having approximately the diameter which is required for the inside of the finished packing, the shrinkage-compensating excess at the ends being disposed side-by-side rather than being superimposed. The packing lengths are thereafter subjected to a pre-shrinking treatment by heating to a temperature of the order of 1000° C. in an inert atmosphere, such as nitrogen gas, for example, to prevent oxidation of the graphite coating.

Figure 2:
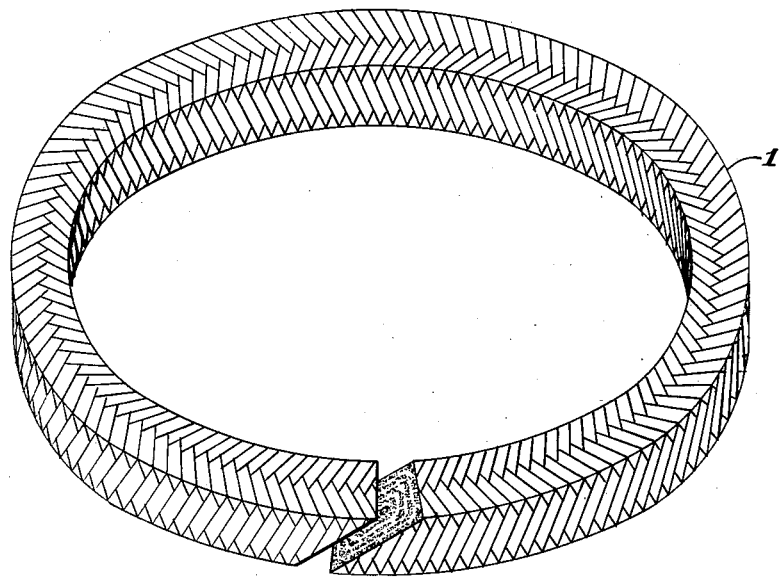
Figure 2 shows a squared form of packing ring.

A typical cycle of heat shrinking may include heating the packing to about 300° C. over a period of about one hour in a flowing stream of nitrogen gas and retaining the material at this temperature for about two hours, until all residual oil is driven off. Thereafter, the temperature may be raised to 900° to 1000° C. in increments of about 100° C. per hour in a static nitrogen atmosphere. The material is preferably maintained at 900° to 1000° C. for about two hours after which heating may be discontinued and the material cooled by radiation to room temperature while still in the protecting nitrogen atmosphere. During this process the hydrocarbon lubricant chars away and is lost from the packing, but this is of no moment since the lubricant will have already served its full purpose in the braiding operation. After the heat treatment, the individual pieces may be cut on a bias at the ends so that the two beveled edges will fit together in a neat lap joint when the pieces are arranged in ring form (refer Figure 2).

Figure 3:
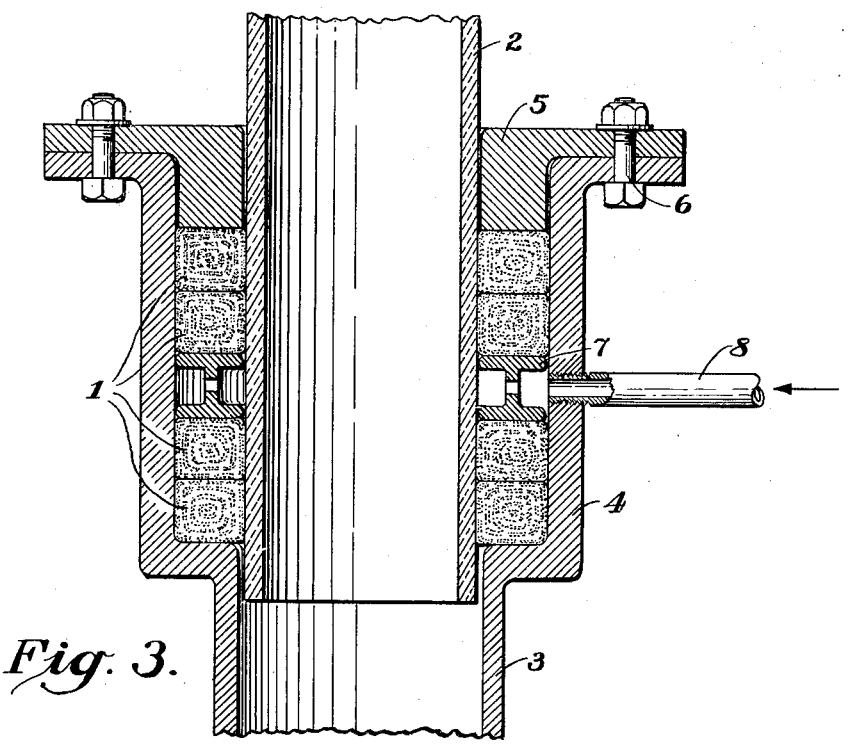
Figure 3 shows one embodiment of high temperature joint packed with rings of the type shown in Figure 2.

Referring to Figure 3, silica tube 2 is shown joined in expansible relationship to metal tube 3 by virtue of its telescopic mounting within the end of tube 3. The clearance allowance between the members will, of course, depend upon the materials of construction of both the tubes, the dimensions of the tubes and the temperature at which the process is to be conducted.

The outer end of metal tube 3 may be expanded into a bell mouth 4 of sufficient diameter to accommodate the individual packing rings 1 snugly. The rings are retained in compressed condition by a gland member 5 secured to the bell mouth by bolts 6 arranged equidistantly around the circumference.

In packing the joint, it is preferably to position and compress each packing ring 1 individually, after which the next packing ring is added. This may be effected by employing a gland member having a long enough lower projection to easily extend to the level of the first packing ring at the bottom of the bell mouth, or the rings may be forced against the silica tube and bell mouth surfaces by use of a mallet and a flat caulking tool. In positioning the packing rings 1 it will be understood that the beveled edges of each are brought into tight abutment to seal against leakage at this point, and the lap joints of successive rings are deliberately located out of register with those of adjacent rings to present a devious path to any leakage which might otherwise occur.

The joint of Figure 3 is shown fitted with a metal lantern ring 7, intermediately located between the several packing rings 1. The use of lantern ring 7 is optional, depending upon the process materials passing through tubes 2 and 3. If these materials are of an oxidizing or chemically corrosive nature they may degraphitize or attack the packing ring material, particularly at the very high temperatures employed. The piped materials may be prevented from ever contacting the packing ring material by flooding the interior of bell mouth 4 with an inert gas, such as nitrogen, for example, which may be supplied through line 8 leading to a suitable source under pressure. The lantern ring serves as a distributor for the even supply of inert gas throughout the inner confines of bell mouth 4. The use of a lantern ring may also be advantageous in another connection, namely, that of assisting in the prevention of process material leakage when the joint may not be drawn to maximum tightness in order to provide play to accommodate the considerable thermal expansions which accompany very high temperature operations.

Figure 4:
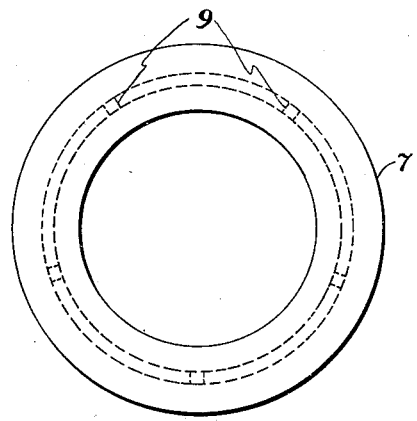
Figure 4 is a plan view of a lantern ring.

As shown in Figures 3 and 4, lantern ring 7 is recessed on opposite sides to provide continuous inner and outer gas channels around the entire circumference of the ring. Drilled holes 9, equally spaced about the ring, connect the inner and outer channels and serve as passages for the equalizing of gas pressures on both sides of the ring. In operation, the inert gas is supplied through line 8 at about the same or at a slightly higher pressure than that carried in the system comprising tubes 2 and 3. We have found that leakage of inert gas into the process piping is negligible if a careful pressure balance is thus maintained.

If the process materials are not of an oxidizing or corrosive nature, lantern ring 7 and line 8 may be dispensed with and the space occupied by ring 7 may be utilized for the accommodation of another packing ring. This is particularly true if gland 5 is relatively close fitting, since very slight, almost undetectable, leakage of process material through the packing will maintain the bell mouth 4 free of atmospheric air and thus prevent deterioration from this cause.

The packing included in this invention also may be advantageously employed to close off the open end of a single tube. In this case the tube may be provided with a stuffing chamber that may be either integral with the tube or which may be a separate element adapted to slide over the end of the tube. In both cases the level of the open end of the tube is carried above the bottom of the stuffing chamber, thereby providing space for the reception of the packing material. The assembly may be completed by a solid closure plate connected with the stuffing chamber by bolts. Such a closure plate is preferably provided with an annular base portion adapted to recess into the space between the outside tube wall and the inside wall of the stuffing chamber, so as to compress and retain the packing in place.

It will be apparent from the detailed description of our preferred embodiment that this invention is capable of wide variation both in the fabrication of the packing material and the method in which it is used. For instance, the relatively low inherent strength of the silica threads may be reinforced in various ways known to the textile art, such as by the incorporation of a single central thread of relatively high strength material in the formation of the individual braiding strands. Thus, a fine cotton thread of, say, No. 80 size, may be used as a base and the silica fibers wound into a strand around it. The cotton thread readily withstands the strains incident to the braiding step. When the composite braid is exposed to high temperatures to effect the pre-shrinking hereinbefore described, the central cotton threads will burn away; however, since the cotton occupies only a relatively small area within the individual strands, and, since the shrinkage of the silica is relatively high, the burning away of the cotton does not noticeably affect the tightness or the density of the braid. A like reinforcement may be attained by the substitution for the cotton thread of a very fine, temperature-resistant, metal thread, such as nickel, for example, whereupon the metal is not affected by the high temperature shrinking step and remains in the packing braid in unaltered condition.

A braided packing ring construction is preferred because of the high density and the avoidance of pores. However, rolls of cloth woven from silica thread and cut on a bias to permit a close fitting within the packing space will give reasonably satisfactory results, particularly if treated with graphite or other sealant in the manner already described for the braided embodiment. A certain amount of sealing effect can even be attained by packing joints with a random mass of free silica fibers. In this case improved sealing can be obtained if the material is packed in small individual batts liberally dusted with a sealant such as powdered graphite, each batt being compressed after placement to secure a relatively dense structure throughout and to assure a minimum of void space. Also, silica packing which has become degraphitized by progressive oxidation over a long period of use will still be moderately effective; however, leakage will increase as the percentage of voids increases due to the removal of the graphite sealant.

The joinder of tubes in accordance with this invention may be effected in a great number of ways, as by butt to butt positioning, the interposition of bellows type expansion take-up members between the tube ends, and in many other ways well known in the art. It will be further understood that, while this invention has been described with particular reference to chemical manufacturing operations, it is equally applicable to other uses where a high temperature, resilient packing material is required, such as in the field of airplane engine construction and like activities. We intend therefore to be limited in the scope of our invention only to the extent indicated in the appended patent claims.

We claim:

1. A high temperature resistant fibrous joint packing and sealing composition, stable at temperatures of 800° C. to 1000° C., formed into strands from a number of substantially pure silica fibers plaited into a succession of superimposed layers one over another to form a composite braid, pre-shrunk at relatively high temperatures, and having a particulate temperature resistant sealing medium incorporated in the interstices of the composite braid.

2. A high temperature resistant fibrous joint packing and sealing composition, stable at temperatures of 800° C. to 1000° C., formed into strands from a number of substantially pure silica fibers plaited into a succession of superimposed layers one over another to form a composite braid, pre-shrunk at relatively high temperatures, and having particulate graphite incorporated in the interstices of the composite braid.

JOHN R. BOYER.
RICHARD M. LUCKRING.

References Cited in the file of this patent

UNITED STATES PATENTS

| Number | Name | Date |
| --- | --- | --- |
| 1,056,282 | Koerting, Jr. et al. | Mar. 18, 1913 |
| 2,027,389 | Lazier | Jan. 14, 1936 |
| 2,132,702 | Simpson | Oct. 11, 1938 |
| 2,245,824 | Roesch | June 17, 1941 |
| 2,337,986 | Fry | Dec. 28, 1943 |
| 2,360,106 | Buhler | Oct. 10, 1944 |
| 2,366,853 | Greene | Jan. 9, 1945 |
| 2,554,234 | Baudry et al. | May 22, 1951 |
| 2,557,343 | Cook | June 19, 1951 |

FOREIGN PATENTS

| Number | Country | Date |
| --- | --- | --- |
| 502,643 | Great Britain | Mar. 22, 1939 |